United States Patent
Wade

(10) Patent No.: US 7,500,679 B2
(45) Date of Patent: Mar. 10, 2009

(54) BOARD FOR SUPPORTING FRONT OF SNOW VEHICLE

(76) Inventor: James T. Wade, 7960 Eagle View La., Granite Bay, CA (US) 95746

( * ) Notice: Subject to any disclaimer, the term of this patent is extended or adjusted under 35 U.S.C. 154(b) by 557 days.

(21) Appl. No.: 11/245,672

(22) Filed: Oct. 7, 2005

(65) Prior Publication Data

US 2007/0001426 A1    Jan. 4, 2007

Related U.S. Application Data

(60) Provisional application No. 60/616,865, filed on Oct. 8, 2004.

(51) Int. Cl.
*A63C 5/07* (2006.01)
(52) U.S. Cl. .............................. 280/28; 280/26; 280/609
(58) Field of Classification Search ................... 280/22, 280/28, 26, 609, 809, 28.14, 28.16; 180/182, 180/190
See application file for complete search history.

(56) References Cited

U.S. PATENT DOCUMENTS

| | | | |
|---|---|---|---|
| 3,632,126 A * | 1/1972 | Shorrock | 280/28 |
| 3,711,109 A * | 1/1973 | Hofbauer | 280/28 |
| 3,866,933 A * | 2/1975 | Mollring | 280/28 |
| 5,344,168 A * | 9/1994 | Olson et al. | 280/28 |
| 5,700,020 A * | 12/1997 | Noble | 280/28 |
| 6,086,101 A * | 7/2000 | Cormican | 280/809 |
| 6,105,979 A * | 8/2000 | Desrochers | 280/28 |
| 6,267,392 B1 * | 7/2001 | Noble | 280/28 |
| 6,331,008 B2 * | 12/2001 | Cormican | 280/22 |
| 6,955,236 B2 * | 10/2005 | Roberts et al. | 180/182 |
| 6,991,056 B2 * | 1/2006 | Roberts et al. | 180/182 |

\* cited by examiner

*Primary Examiner*—Christopher P Ellis
*Assistant Examiner*—Brian Swenson
(74) *Attorney, Agent, or Firm*—Bradley P. Heisler

(57) ABSTRACT

A board is provided particularly for supporting a front of a snow vehicle. The board is provided alone as a single board for a forward portion of the snow vehicle with the board capable of floating upon soft snow. The board includes a mounting bracket on an upper surface for mounting to a chassis of the snow vehicle. The running surface opposite the upper surface floats the board upon the snow or other support surface and preferably includes a central fin and a pair of skegs extending down from the running surface. Side edges of the board can engage the snow to allow turns to be carved by the snow vehicle. The central fin can be adjusted in position and depth and has various different configurations to provide optimal steering control of the snow vehicle through the board.

16 Claims, 3 Drawing Sheets

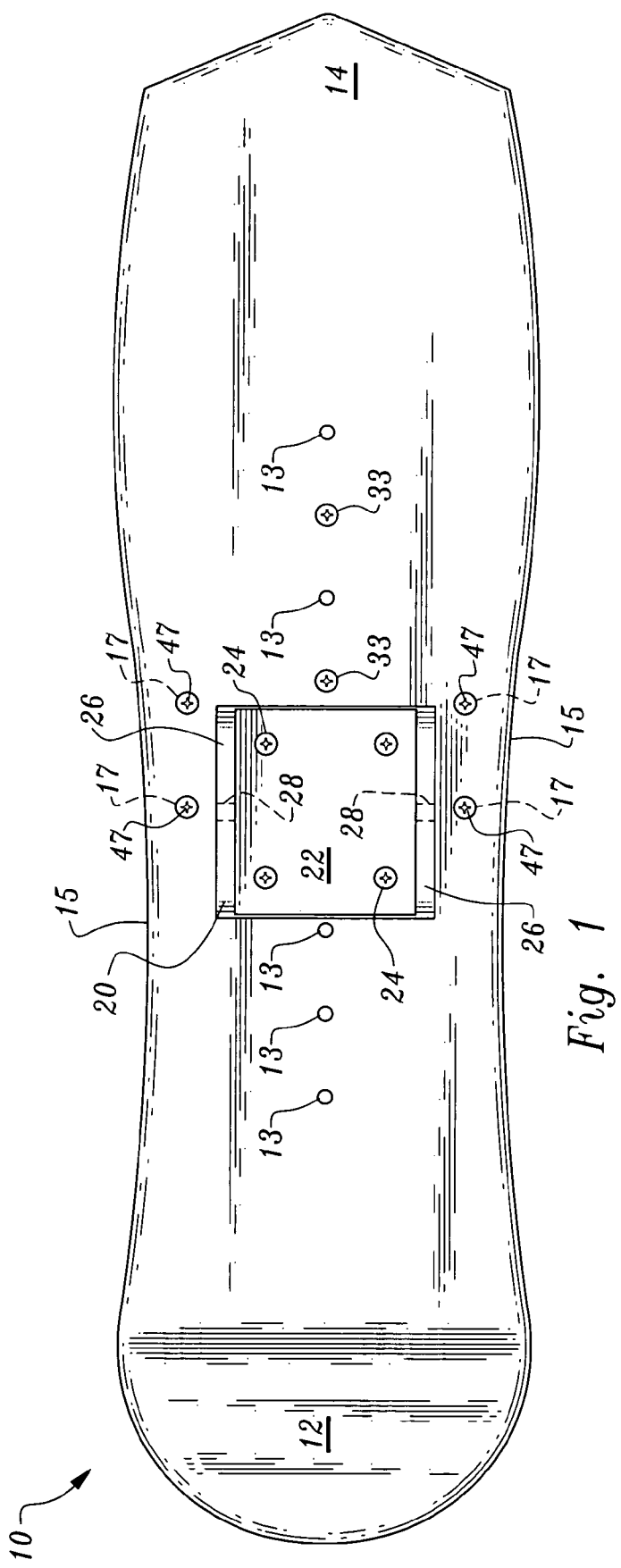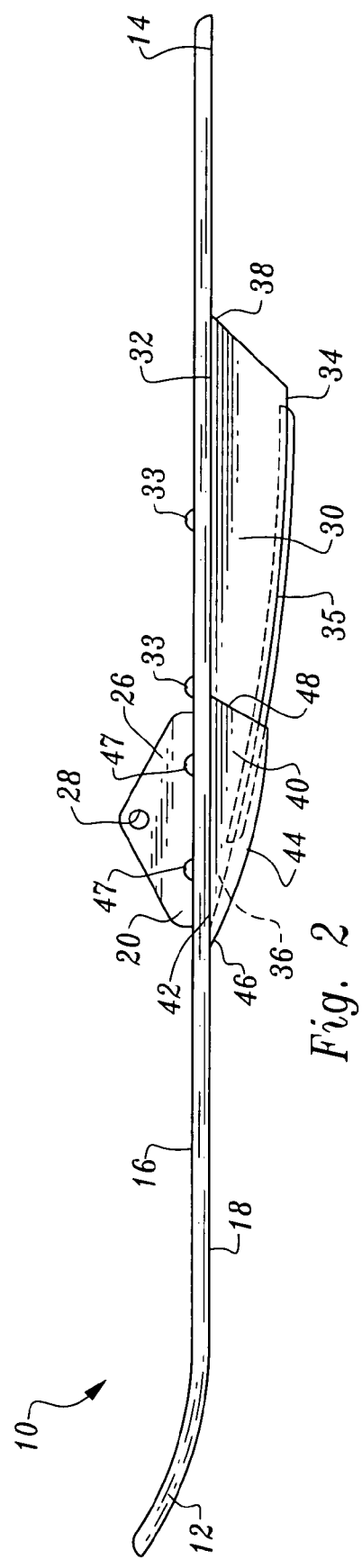

BOARD FOR SUPPORTING FRONT OF SNOW VEHICLE

CROSS-REFERENCE TO RELATED APPLICATIONS

This application claims benefit under Title 35, United States Code § 119(e) of U.S. Provisional Application No. 60/616,865 filed on Oct. 8, 2004.

FIELD OF THE INVENTION

The following invention relates to snow vehicles, such as snowmobiles which include a chassis and a propulsion unit. More particularly, this invention relates to boards mountable to lower forward portions of snow vehicles to support the snow vehicle upon the snow and to facilitate steering of the snow vehicle when moving.

BACKGROUND OF THE INVENTION

Standard snowmobiles and similar snow vehicles have a general configuration including a chassis from which a propulsion unit and steering supports extend downwardly to engage the snow. The propulsion unit is typically in the form of a moving track which is driven by some form of motor mounted to the chassis and engages the snow to move the snowmobile or other snow vehicle forward. The chassis also typically supports a seat for a rider to sit. The steering module of a standard snowmobile or similar snow vehicle is typically in the form of a pair of snow skis which are rigid in form and which are together typically no more than 35% of a width of the propulsion unit, with the propulsion unit similar in width, but slightly of less width than the chassis. Runners typically extend down from a lower surface of the skis and the skis are typically coupled to a steering mechanism actuated by hands of the rider. The skis pivot from side to side so that the runner on the bottom of the skis can engage underlying snow at different angles to steer the vehicle.

Due to the size limitations of the skis on typical snowmobiles, and particularly the relatively narrow width of the two skis, the skis do not particularly "float" on the snow. Especially when the snow is powdery, snowmobiles rely heavily on the runner and the poorly floating skis themselves being turned away from the direction of vehicle travel to cause the vehicle to turn. Such steering is not particularly efficient with the skis typically semi-buried in the soft powder. Rather, snowmobiles are optimized more particularly for running on hard-packed snow or ice. Furthermore, with a typical snowmobile with steering skis, the inability of the skis to float significantly makes the overall riding experience less analogous to a "floating" experience similar to that of skiing or snowboarding, and more like a motorized vehicle experience.

Accordingly, a need exists for a powered snow vehicle which utilizes a single wide floating board for steering. Such a steering board would allow the vehicle to have its front end supported in a somewhat floating fashion for greater efficiency in soft powder conditions and to enhance the overall enjoyment of the experience of riding over the snow.

SUMMARY OF THE INVENTION

With this invention, a board is provided particularly for mounting to a forward lower portion of a powered snow vehicle for supporting the forward portion of the snow vehicle and for accommodating steering of the snow vehicle. The board has a width which is preferably approximately one-third of a length of the board, and at least one-fifth the length of the board. This board width is typically at least half, and preferably similar to a width of the propulsion unit and chassis of the snow vehicle.

The board includes an upper surface with a mounting bracket or similar mount thereon which is adapted to couple the board to the chassis, such as through a board support strut which can be coupled to a steering control on the chassis. The running surface of the board, opposite the upper surface, is substantially planar and allows the board to float upon the snow, even when the snow is powdery.

Preferably, at least one fin extends downward from the running surface of the board. This fin is preferably located within a central plane perpendicular to the running surface and aligned with a longitudinal axis of the board. The fin can either be fixed in position or be adjustable. Such adjustability can be forward and rearward adjustability and/or upward and downward adjustability. In the case of upward and downward adjustability, such adjustability can be selected by the user, such as by attaching the fin to the board in the desired configuration. Alternatively, the fin can be mounted in a pivoting fashion with an associated spring and damper biasing the fin toward a most downward position unless forces are applied to the fin which cause the fin to flex upwardly to extend a lesser distance down from the running surface.

Skegs are preferably provided as side fins adjacent to the larger central fin, with each of the fins located in separate parallel planes and equally spaced from each other. The skegs can either be fixed in a single position or be adjustably positionable relative to the running surface of the board. A carbide insert or other hardened material insert is preferably provided on bottom edges of the fins to maximize wear characteristics for the fins. Also, side edges of the board are preferably formed of metal and sufficiently sharp to allow the side edges of the board to cut into underlying snow or ice to allow the board to carve turns utilizing these side edges, rather than relying upon the fins, and especially taking advantage of a preferred hourglass shape for each of the side edges of the board to carve smooth turns.

OBJECTS OF THE INVENTION

Accordingly, a primary object of the present invention is to provide a powered snow vehicle with a single board for supporting a forward portion of the snow vehicle.

Another object of the present invention is to provide a board for a snow vehicle which has a relatively wide contour and is mounted on a forward lower portion of the snow vehicle to allow the snow vehicle to float somewhat upon a surface of the snow.

Another object of the present invention is to provide a board for a front of a snow vehicle to steer the snow vehicle Another object of the present invention is to provide a snow vehicle which is steered at least partially by tilting the snow vehicle to cause side edges of a board on a front of the snow vehicle to engage the snow to cause a turn to occur.

Another object of the present invention is to provide a board for a snow vehicle which utilizes side edges to engage the snow for turning in soft snow conditions and which utilizes at least one fin extending downward from a running surface of the board for steering of the snow vehicle in harder snow conditions.

Another object of the present invention is to provide a board for a snow vehicle which has fins which are adjustable in position to maximize the effectiveness of the steering attributes provided by the board for the snow vehicle.

Other further objects of the present invention will become apparent from a careful reading of the included drawing figures, the claims and detailed description of the invention.

BRIEF DESCRIPTION OF THE DRAWINGS

FIG. 1 is a top plan view of the board of this invention.

FIG. 2 is a side elevation view of that which is shown in FIG. 1.

DESCRIPTION OF THE PREFERRED EMBODIMENT

Figure 3:
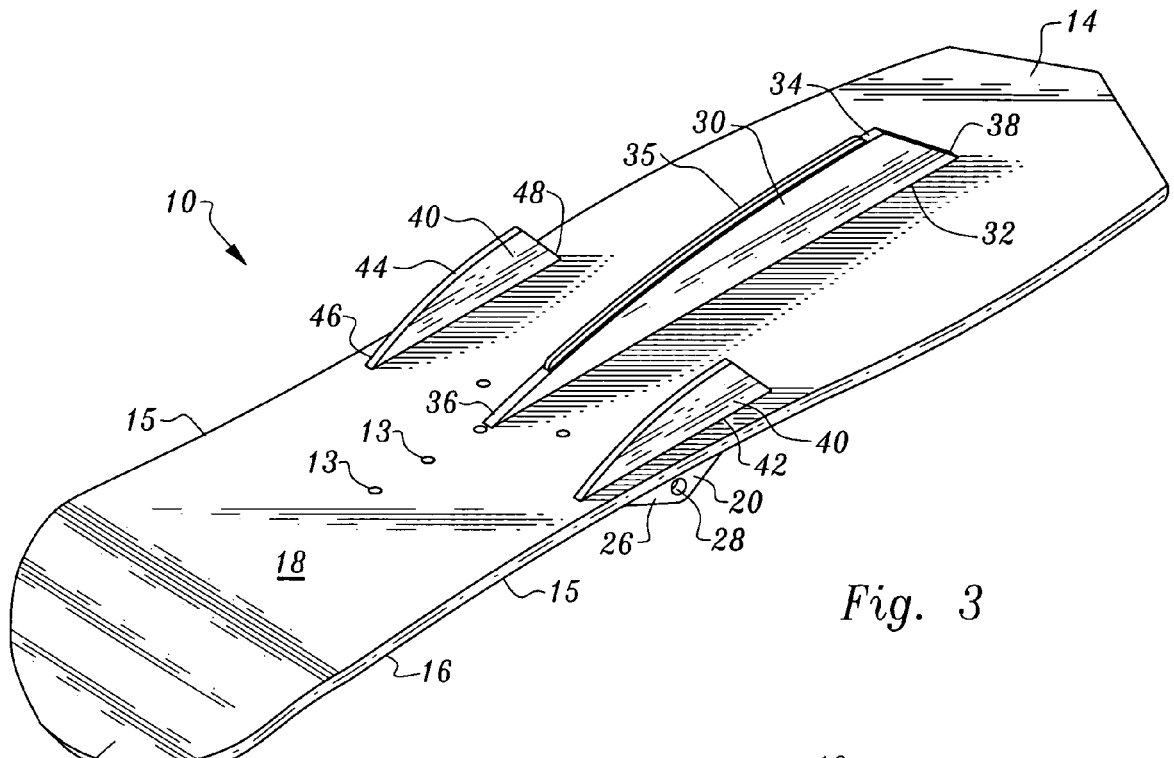
FIG. 3 is a perspective view taken from below, further illustrating that which is shown in FIG. 1.

Referring to the drawings, wherein like reference numerals represent like parts throughout the various drawing figures, reference numeral 10 is directed to a board (FIGS. 1-3) particularly for use in supporting a front of a snow vehicle 2 (FIG. 8) such as a snowmobile or similar vehicle. The board 10 provides for both support of the front of the snow vehicle 2 upon snow and steering of the snow vehicle 2 through action of side edges 15 of the board 10, and/or a central fin 30 and skegs 40 extending downwardly from the board 10.

In essence, and with particular reference to FIGS. 1-3, basic details of the board 10 of this invention, according to the preferred embodiment, are described. The board 10 is a generally planar semi-elongate body extending from a nose 12 to a tip 14 and with an upper surface 16 opposite a running surface 18. A mounting bracket 20 is coupled to the upper surface 16. The mounting bracket 20 is adapted to couple the board 10 to the chassis 6, such as through a board support strut 8 (FIG. 8) to both support the chassis 6 of the snow vehicle 2 upon the snow, and to facilitate steering of the snow vehicle 2.

At least one fin in the form of a central fin 30 extends vertically downwardly from the running surface 18 of the board 10. This central fin 30 facilitates steering of the snow vehicle 2 (FIG. 8) especially in hard snow and ice conditions. Skegs 40 in the form of side fins preferably extend vertically downwardly from the board 10 in a manner parallel with the central fin 30, but laterally spaced from the central fin 30 similar distances from opposite sides of the central fins 30 and near the side edges 15 of the board 10. The skegs 40 further assist in allowing the board 10 to steer, especially on hard snow and ice.

Figure 8:
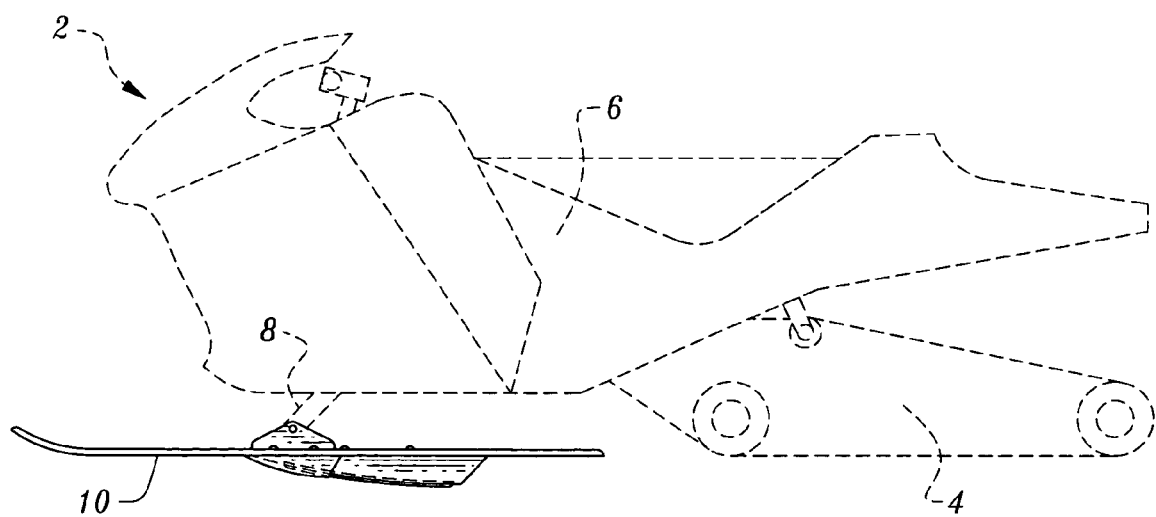
FIG. 8 is a side elevation view of an entire snow vehicle and showing where the board of this invention is coupled to other portions of the snow vehicle.

More specifically, and with particular reference to FIG. 8, details of one typical snow vehicle 2 with which the board 10 can be utilized, according to the preferred embodiment, are described. This snow vehicle 2 is generally in the form of a snowmobile, but would typically be smaller than the smallest typical snowmobiles, and is most particularly distinguished from standard snowmobiles in that a single board 10 is provided rather than a pair of skis for steering of the snow vehicle 2. The snow vehicle 2 includes a propulsion unit 4 extending from a lower rearward portion of the snow vehicle 2. This propulsion unit 4 would typically be coupled to a motor on the chassis 6 and is in the form of a revolving track adapted to engage the snow/ice under the snow vehicle 2 to push the snow vehicle 2 along the surface of the snow.

The chassis 6 provides a rigid structure from which the propulsion unit 4 and the board 10 extend downwardly. The chassis 6 also typically includes a seat upon which an operator can sit, or could alternatively include some other platform, such as a standing platform or foot pegs to allow the rider to stand while driving the snow vehicle 2.

Typically, some form of steering control is provided upon the chassis 6 and coupled to the board 10 to enhance control of the board 10 to steer the snow vehicle 2. For instance, some form of handlebars can be coupled to the board 10 through a board support strut 8 (FIG. 8) which allows the board 10 to pivot somewhat for steering of the board 10 and hence the entire snow vehicle 2. As an alternative, the board 10 can be fixed or substantially fixed relative to the chassis 6, and steering of the snow vehicle 2 can occur by pivoting of the entire snow vehicle 2 to allow side edges 15 (FIGS. 1 and 3) to carve into the snow/ice and cause the snow vehicle 2 to turn. Most preferably, at least some form of board 10 pivoting, at least a slight amount, is provided to further assist in causing side edges 15 of the board 10 to engage a surface of the snow to initiate turning of the snow vehicle 2. In harder snow conditions, the fins 30 and skegs 40 can engage the snow/ice beneath the snow vehicle 2 to facilitate turning of the snow vehicle 2.

With particular reference to FIGS. 1-3, details of the board 10 and particularly the body of the board 10, according to the preferred embodiment, are described. The board 10 is primarily composed of a body which is generally planar in form and semi-elongate, extending from a nose 12 to a tail 14. The width of the board 10 preferably varies slightly, with an average width of about one-third of the board 10 length. At a minimum, the board 10 is preferably no less than one-fifth as wide as it is long, with a width to length ratio of four to one also being acceptable.

The nose 12 is preferably curved slightly upwardly to keep the nose 12 from digging into snow or other objects forward of the board 10 and snow vehicle 2. Otherwise, the body is substantially planar, and preferably with a substantially constant thickness between the upper surface 16 and the running surface 18.

The body of the board 10 is preferably formed of a plastic or composite material. Optionally, the body of the board 10 can be formed of wood. The body of the board 10 is preferably somewhat flexible with sufficient rigidity to avoid being flexed when no loads are placed upon the body of the board 10. However, when loads are placed on the body of the board 10 exceeding merely the weight of the board 10 itself, the body of the board 10 is capable of flexing somewhat. For instance, when the weight of the chassis 6, and rider upon the chassis 6 is pressing down on the board 10, and the board 10 encounters uneven terrain, the running surface 18. of the board 10 is caused to maintain more complete contact with the snow/ice due to the flexing ability of the body of the board 10.

As an alternative, this flexing ability of the body of the board 10 can be adjusted, such as by swapping boards 10 formed of different body material, or by providing torsional or longitudinal stiffeners which can either be removably attached to the board or adjusted to control stiffness and flexibility of the body of the board 10. Other than limited flexing in a vertical direction, the body of the board 10 is preferably substantially rigid.

The body of the board 10 includes central mount holes 13 utilized for attachment of the central fin 30, as described in detail below. The body of the board 10 additionally includes side mount holes 17 through which the skegs 40 of the board 10 are mounted, as described in detail below. Side edges 15 extend from the nose 12 to the tail 14. These side edges 15 have a cross-sectional form similar to that depicted as the side edges 115 and side edges 215 of the alternative embodiments of FIGS. 6 and 7. This sharp edge preferably provided on the side edges 15 allows the side edges 15 to carve turns in soft and medium hard snow in a manner similar to an edge of a snow ski or a snowboard.

The side edges 15 preferably have an at least partial "hourglass" form so that the side edges 15 are slightly further from each other near the nose 12, then slightly closer to each other near a center portion of the board 10 and near the mounting bracket 20, and then again widening on portions of the board 10 to a rear of the mounting bracket 20, with the side edges 15 preferably again tapering slightly towards each other near the tail 14.

This hourglass shape particularly facilitates turning of the snow vehicle 2 (FIG. 8) when the entire snow vehicle 2 is leaned to one side so that one of the side edges 15 of the board 10 engages the snow. Such engaging of the side edges 15 can be additionally encouraged by actuating steering control on the chassis 6 of the snow vehicle 2 (FIG. 8) such that steering of the snow vehicle 2 can occur either by leaning of the entire chassis 6, or by actuation of steering control on the chassis 6 by the user, or by some combination of leaning and actuation of steering control. Due to the hourglass shape of the side edges 15, once the board 10 is angled to be supported upon the snow through one of the side edges 15, this hourglass shape causes the board 10 to desire to follow a curving path in turn causing the entire snow vehicle 2 to be turned.

With continuing reference to FIGS. 1-3, details of the mounting bracket 10 or other mount for connecting the board 10 to the chassis 6 of the snow vehicle 2, according to this preferred embodiment, are described. The mounting bracket 20 provides a preferred form of mount for coupling the board 10 to the chassis 6 of the snow vehicle 2, such as through a board support strut 8. In this preferred embodiment, the mounting bracket 20 includes a plate 22 which is planar and coupled to the body of the board 10 through the upper surface 16, by utilizing a plurality of mounting screws 24. Lateral sides of the mounting bracket 20 include ears 26 extending vertically upward from side edges of the mounting bracket 20. Each of these ears 26 preferably includes a hole 28 passing therethrough. These holes 28 are aligned with each other so that they can receive a mounting pin passing through each of the holes 28 in each of the ears 26, and also passing through the board support strut 8.

This mounting pin can be circular and configured to allow the board 10 to pivot about this pin relative to the board support strut 8. Alternatively, the pin can be of square cross-section, or otherwise be configured to resist rotation of the board 10 relative to the board support strut 8. The board support strut 8 can be rigidly mounted to the chassis 6, or coupled to the chassis 6 through some form of steering control on the chassis 6. If steering control is provided through the board support strut 8, this board support strut 8 can be capable of some form of motion including rotational motion about various different rotational axes and/or linear motion in various different directions. Alternatively, the board support strut 8 can be substantially fixed in position with various different board 10 position control actuators also coupled between the chassis 6 and the board 10 to cause the board 10 to pivot about various different axes relative to the chassis 6, while the board support strut 8 remains fixed in position.

Figure 4:
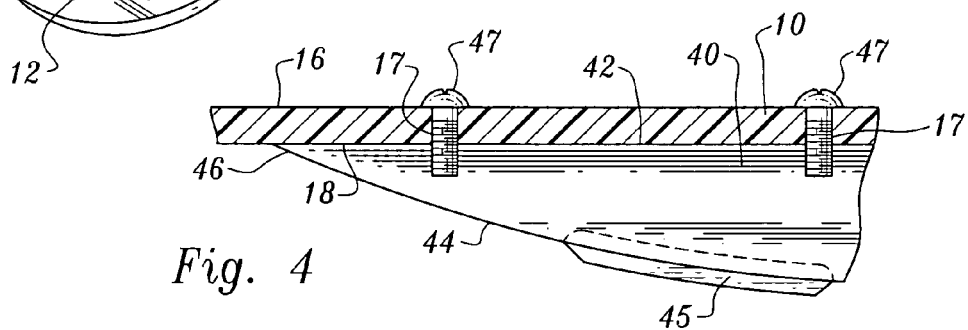
FIG. 4 is a side elevation view of a portion of that which is shown in FIGS. 1-3 and revealing details of the skegs of this invention.

With particular reference to FIGS. 2-4, details of the central fin 30, according to the preferred embodiment, are described. The central fin 30 is preferably a rigid structure formed of a high strength material, such as steel, with some form of coating which allows the central fin 30 to resist corrosion when placed in the operating environment extending down from the running surface 18 of the board 10. The central fin 30 is preferably a largest of all of the fins 30 and is aligned within a central plane extending vertically down from a central axis extending from the nose 12 to the tail 14.

The central fin 30 includes a top edge 32 which is placed adjacent the running surface 18. A series of mount screws 33 pass through the central mount holes 13 and extend into the top edge 32 of the fin 30 to secure the central fin 30 to the running surface 18. Preferably, more central mount holes 13 are provided than are necessary, at uniformly spaced locations, and the central fin 30 can thus be readily mounted at various different positions along the central axis of the running surface 18. In this way, a user can customize performance of the board 10 by adjusting a position of the fin 30 front to rear. Also, by removing the mount screws 33, one central fin 30 (such as that depicted in the drawings herein) could be substituted for a central fin having a different geometry, made of a different material, or otherwise exhibiting different performance characteristics.

The central fin 30 includes a bottom edge 34 opposite the top edge 32. This bottom edge 34 defines a portion of the central fin 30 which typically engages the underlying snow/ice during operation of the snow vehicle 2 (FIG. 8). Hence, this bottom edge 34 benefits from inclusion of a carbide insert 35 of hardened carbide steel, or other particularly hard material. This carbide insert 35 preferably extends along only portions of the bottom edge 34 which would engage the snow/ice or other underlying surface when this underlying surface is particularly hard. Hence, it is not required that the carbide insert 35 have a length as long as the bottom edge 34. The central fin 30 extends from a front tip 36 to a rear tip 38. This overall length is preferably approximately half of an overall length of the board 10. However, a length of the central fin 30 could be modified according to various different alternative embodiments.

With particular reference to FIGS. 2-4, details of the skegs 40, according to the preferred embodiment, are described. The skegs 40 act as side fins to further allow the board 10 to steer effectively, particularly on hard snow and ice. These skegs 40 not only assist in steering, but also provide the board 10 with some form of lateral balance when particularly hard conditions exist, and the board 10 is riding up upon the fin 30 and skegs 40.

The skegs 40 include top edges 42 which are adapted to abut the running surface 18 of the board 10. Bottom edges 44 opposite the top edges 42 are adapted to come into contact with the snow or other underlying surface upon which the board 10 is sliding. Most preferably, a carbide insert 45 (FIG. 4) is provided on the skegs 40, generally similar to the carbide insert 35 of the central fin 30 (FIGS. 2 and 3). Alternatively, the skegs 40 can be formed without such a carbide insert 45. The skegs 40 typically do not extend downward from the running surface 18 quite as far as the central fin 30. However, a depth of the skegs 40 between the top edges 42 and bottom edges 44 could be varied to customize the board 10 with a desired performance. Mount screws 47 extend through the side mount holes 17 in the board 10 and into the top edges 42 of the skegs 40 for mounting of the skegs 40 upon the running surface 18 of the board 10.

Figure 6:
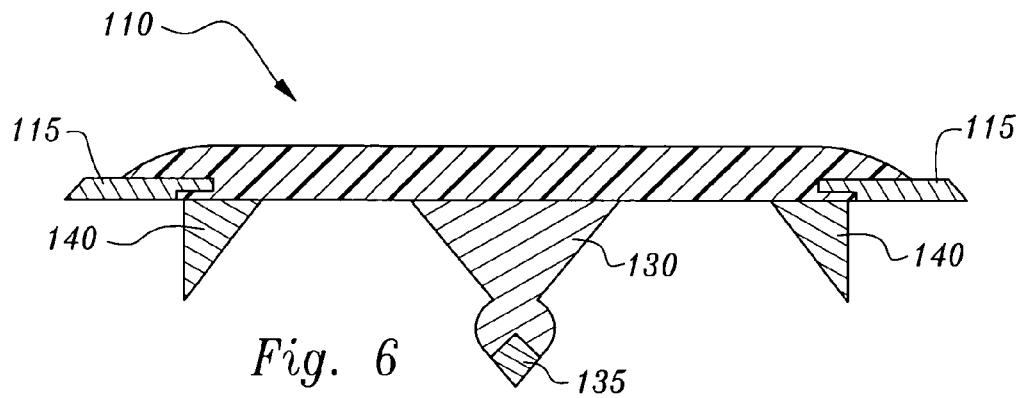
FIG. 6 is a full sectional view of an alternative board of that which is shown in FIGS. 1-3 and particularly providing cross-sectional details of a central fin and skegs, as well as side edge details of the board.
Figure 7:
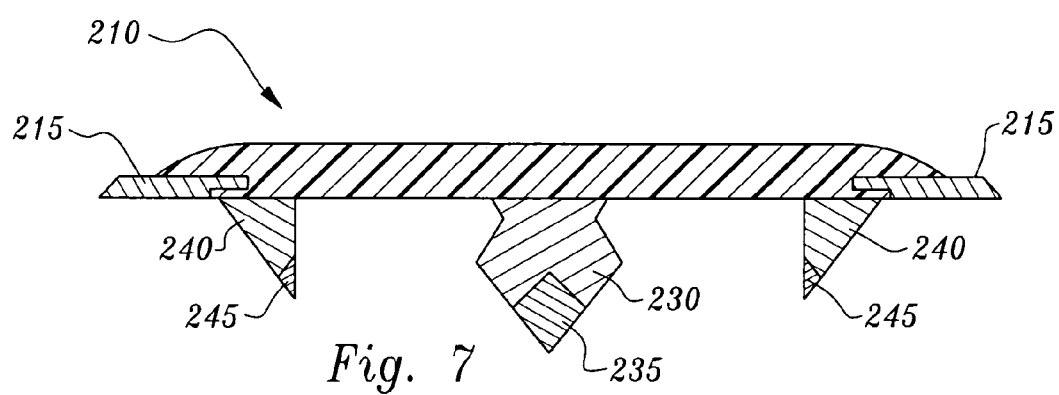
FIG. 7 is a full sectional view similar to that which is shown in FIG. 6, but revealing an additional alternative embodiment for the central fin and skegs according to this alternative embodiment.

With particular reference to FIGS. 6 and 7, details of the first alternative board 110 and second alternative board 210 are described. The first alternative board 110 (FIG. 6) is similar to the board 10 of the preferred embodiment except for the particular configuration of the alternative central fin 130 and alternative skegs 140. In particular, the central fin 130 is not provided with a planar form, exhibiting a substantially constant thickness, as with the central fin 30 of the preferred embodiment (FIGS. 2 and 3). Rather, the first alternative central fin 130 has a tapering form with a unique narrow notched shape and is configured in this embodiment to include a carbide tip 135. The first alternative skegs 140 are triangular in cross-section to maximize an ability of the first alternative board 110 to carve turns in soft snow. Side edges 115 of the first alternative board 110 and second alternative board 210 (FIG. 7) are further provided to enhance carving of such turns, in soft and medium hard snow.

With the second alternative board 210, the fins 230 and skegs 240 are further slightly modified. With the second alternative central fin 230, the central fin 230 is wider than the central fin 30 of the preferred embodiment and again includes a carbide tip 235. The second alternative skegs 240 include carbide tips 245 and are triangular in shape, but with a tapering side facing outwardly, in contrast to the first alternative skegs 140 of the first alternative board 110 (FIG. 6). In such a configuration, carving characteristics of the board 10 are somewhat less aggressive as that depicted with the first alternative board 110, but with side edges 215 similar to those provided with the first alternative board 110 and the board 10 of the preferred embodiment. The alternative boards 110, 210 thus illustrate how various different fin and skeg configurations can be utilized to alter performance of the board 10 as desired.

Figure 5:
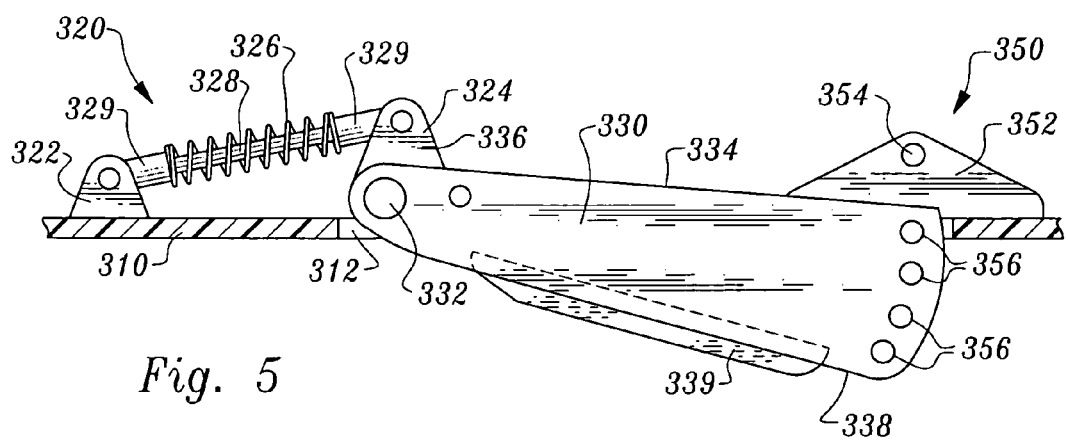
FIG. 5 is a side elevation view of an alternative board with an adjustable fin, with height adjustability of the fin provided in two different ways which can either be utilized together or separately in various different embodiments of this invention.

With particular reference to FIG. 5, details of a third alternative board 310 and an associated pivoting fin 330 are described. With this third alternative board 310, a slot 312 is provided through which a pivoting fin 330 is mounted. This pivoting fin 330 can either be fixed at various different depth positions relative to the board 310 or configured to be adjustably positionable depending on forces applied to the pivoting pin 330 (or both).

In a first form, this third alternative board 310 has the pivoting fin 330 coupled to the board 310 through a suspension 320. The suspension 320 includes a board mount 322 and a fin mount 324 with a spring 326 interposed between the board mount 322 and fin mount 324. A central shaft 328 extends between the board mount 322 and fin mount 324, with this central shaft 328 pivotably supported at a first end and slidably supported at a second end.

Ends 329 of the spring 326 include large diameter rigid portions which engage ends of the linear compression spring 326. This spring 326 causes the pivoting fin 330 to pivot downward about a pivot axle 332 pivotably mounting the pivoting fin 330 to the third alternative board 310. The pivoting fin 330 includes a top edge 334 with a lever 336 extending upwardly therefrom and to which the fin mount 324 of the suspension 320 is attached. A bottom edge 338 of the pivoting fin 330 is opposite the top edge 334 and adapted to contact snow or other surface underlying the third alternative board 310. A carbide insert 339 is shown on this bottom edge 338 of the pivoting fin 330.

When the third alternative board 310 is in soft snow, or otherwise no forces are acting upon the pivoting fin 330 other than gravity forces and the forces of the spring 326, the spring 326 causes the pivoting fin 330 to pivot downwardly a maximum amount to maximize a depth with which the pivoting fin 330 can extend into snow, such as soft powder snow. In this way, the pivoting fin 330 provides a maximum extent of surface area to allow the board 10 to turn within soft snow. When the snow is harder, or obstacles are encountered by the pivoting fin 330, forces act upon the bottom edge 338 of the pivoting fin 330, causing the spring 326 to be compressed, and causing the pivoting fin 330 to pivot upwardly about the pivot axle 332, so that less of the pivoting fin 330 extends down from the third alternative board 310. Optionally, the central shaft 328 can be in the form of a shock absorber, to damp out any vibration or oscillation tendencies of the spring 26 and pivoting fin 330.

As an alternative for the third alternative board 310, or in addition to the suspension 320, the pivoting pin 330 can be positioned through utilization of a lockout bracket 350. The lockout bracket 350 includes a flange 352 preferably mounted upon the third alternative board 310. A hole 354 is located in the flange 352. A multi-hole array 356 is formed in the pivoting fin 330. Each of the holes in the multi-hole array 356 can be aligned with the hole 354 in the flange 352. A bolt, or other pin can be passed through the hole 352 in one of the holes in multi-hole array 356 to lock the pivoting fin 330 in a desired position. In this way, a user selectable depth for the pivoting fin 330 is provided. In such an arrangement, the pivoting fin 330 could be configured to slide up and down rather than pivoting, and still provide for depth adjustment to a desired depth.

Such user controlled depth adjustment can be provided separate from the suspension 320, or in addition to the suspension 320. If no suspension 320 is provided, pivoting fin 330 adjustment is only provided by a user utilizing the lockout bracket 350 and associated holes in the multi-hole array 356. If both the suspension 320 and lockout bracket 350 are utilized together, the pivoting pin 330 can be automatically height positioned by merely providing no pin between the lockout bracket 350 and the multi-hole array 356, so that the pivoting pin 330 can freely pivot up and down, other than through forces exerted on the pivoting fin 330 by the spring 326. If the user wishes to lockout the suspension 320 and lock the position of the pivoting fin 330, the user would merely utilize an appropriate pin through the hole 354 in the flange 352 and one of the holes in the multi-hole array 356 so that the pivoting fin 330 can be positioned precisely where desired. The third alternative board 310 can also be configured where the suspension 320 is provided without the lockout bracket 350, so that the pivoting fin 330 is always adjustable. FIG. 5 thus depicts a composite drawing of both alternatives of the third alternative board 310 together, even though these two alternatives can be provided either together or separately.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which

What is claimed is:

1. A board for supporting a front end of a snow vehicle, the board comprising in combination: a substantially planar body with an upper surface opposite a running surface;
   said body extending laterally between side edges of said body;
   said body extending longitudinally from a nose to a tail;
   said body having a lateral width at least as great as one-fifth of a longitudinal length of said body; and
   at least one fin extends down from said running surface of said body, the at least one fin including a bottom edge extending between a front tip and a rear tip, wherein said at least one fin is oriented within a central plane perpendicular to said running surface and extending in a longitudinal direction;
   said at least one fin adapted to be adjustably coupled to said body with at various different positions by a plurality of mounting holes positioned along a centerline of said body and extending between said nose and said tail;
   said at least one fin includes a hardened material forming at least a portion of a bottom edge of said at least one fin;
   a pair of skegs extend downwardly from said running surface on either side of said at least one fin and substantially parallel with said at least one fin;
   a mount on said upper surface, said mount adapted to be coupled to a chassis of a snow vehicle.

2. The board of claim 1 wherein said at least one fin is adapted to be adjusted in height to extend a variable distance below said running surface of said body.

3. The board of claim 2 wherein said at least one fin is pivotably mounted to said body with a spring interposed between said at least one fin and said body, said spring biasing said fin in a downward most orientation in which said at least one fin remains until pivoting forces act upon said at least one fin sufficiently great to overcome a spring force of said spring to cause said at least one fin to pivot relative to said body and toward an at least partially retracted position.

4. The board of claim 2 wherein said at least one fin is adapted to move vertically relative to said body, said body including a means to adjustably secure said at least one fin at a plurality of different heights relative to said body.

5. The board of claim 1 wherein said body has a lateral width at least as great as one-fourth of a longitudinal length of said body.

6. The board of claim 5 wherein a lateral width of said body is about one-third of a longitudinal length of said body.

7. The board of claim 1 wherein said side edges of said board are sufficiently sharp to at least partially engage an underlying surface, such that said board can carve a turn with one of said edges in contact with the underlying surface.

8. The board of claim 7 wherein said side edges exhibit a curving contour when viewed in a plan view with said side edges further from each other adjacent said nose and adjacent said tail than at a midpoint between said nose and said tail, such that said side edges together provide said body with a somewhat hourglass contour.

9. A board for supporting a front end of a snow vehicle, the board comprising in combination:
   a substantially planar body with an upper surface opposite a running surface;
   said body extending laterally between side edges of said body;
   said body extending longitudinally from a nose to a tail;
   at least one fin extends down from said running surface of said body, the at least one fin including a bottom edge extending between a front tip and a rear tip, wherein said at least one fin is oriented within a central plane perpendicular to said running surface and extending in a longitudinal direction;
   said at least one fin adapted to be adjustably coupled to said body with at various different positions by a plurality of mounting holes positioned along a centerline of said body and extending between said nose and said tail;
   said at least one fin includes a hardened material forming at least a portion of a bottom edge of said at least one fin;
   a pair of skegs extend downwardly from said running surface on either side of said at least one fin and substantially parallel with said at least one fin;
   a mount on said upper surface, said mount adapted to be coupled to a chassis of a snow vehicle; and
   wherein said side edges of said board are sufficiently sharp to be adapted to at least partially engage an underlying surface, such that said board can carve a turn with one of said edges in contact with the underlying surface.

10. The board of claim 9 wherein at least one fin extends down from said running surface of said body.

11. The board of claim 10 wherein a pair of skegs extend downwardly from said running surface on either side of said at least one fin and substantially parallel with said at least one fin.

12. The board of claim 10 wherein said at least one fin is adapted to be adjusted in height to extend a variable distance below said running surface of said body.

13. The board of claim 12 wherein said at least one fin is pivotably mounted to said body with a spring interposed between said at least one fin and said body, said spring biasing said fin in a downward most orientation in which said at least one fin remains until pivoting forces act upon said at least one fin sufficiently great to overcome a spring force of said spring to cause said at least one fin to pivot relative to said body and toward an at least partially retracted position.

14. The board of claim 12 wherein said at least one fin is adapted to move vertically relative to said body, said body including a means to adjustably secure said at least one fin at a plurality of different heights relative to said body.

15. The board of claim 9 wherein said body has a lateral width at least as great as one-fifth of a longitudinal length of said body.

16. The board of claim 9 wherein said body is formed of an at least partially flexible material such that said nose of said body can flex relative to said mount and said tail of said body can flex relative to said mount.

* * * * *